(12) United States Patent
Lehikoinen et al.

(10) Patent No.: US 6,559,872 B1
(45) Date of Patent: May 6, 2003

(54) 1D SELECTION OF 2D OBJECTS IN HEAD-WORN DISPLAYS

(75) Inventors: Juha Lehikoinen, Tampere (FI); Riku Suomela, Tampere (FI)

(73) Assignee: Nokia Corporation, Nokia Group (FI)

( * ) Notice: Subject to any disclaimer, the term of this patent is extended or adjusted under 35 U.S.C. 154(b) by 0 days.

(21) Appl. No.: 09/566,509

(22) Filed: May 8, 2000

(51) Int. Cl.⁷ ............................... G06F 3/14; G06F 3/02
(52) U.S. Cl. ...................... 345/856; 345/862; 345/642; 345/157; 340/990
(58) Field of Search ................. 345/856, 764, 345/862, 858–861, 157, 159, 160, 642, 442; 340/989–991, 995; 701/200, 207, 208, 213

(56) References Cited

U.S. PATENT DOCUMENTS

| | | | | |
|---|---|---|---|---|
| 5,341,152 A | * | 8/1994 | Avai et al. | 345/157 X |
| 5,438,687 A | * | 8/1995 | Suchowerskyj et al. | 345/157 X |
| 5,473,343 A | * | 12/1995 | Kimmich et al. | 345/860 |
| 6,046,722 A | * | 4/2000 | McKiel, Jr. | 345/862 |
| 6,075,531 A | * | 6/2000 | DeStefano | 345/856 X |
| 6,124,843 A | * | 9/2000 | Kodama | 345/856 |

* cited by examiner

Primary Examiner—Raymond J. Bayerl
(74) Attorney, Agent, or Firm—Cohen, Pontanl, Lieberman & Pavane

(57) ABSTRACT

A method for selecting an object in a two-dimensional display using a one-dimensional input device includes displaying a selector circle on the display and increasing or decreasing the radius of the selector circle until the perimeter of the circle coincides with the object on the display.

28 Claims, 2 Drawing Sheets

1D SELECTION OF 2D OBJECTS IN HEAD-WORN DISPLAYS

BACKGROUND OF THE INVENTION

1. Field of the Invention

The present invention relates to object selection on a two dimensional display using a one-dimensional input device.

2. Description of the Related Art

The selection of an object on a two-dimensional display is one of the most important tasks in current graphical user interfaces. An input device is used to select an object among other objects on the display and then to activate the selected object. A two-dimensional input device such as a mouse or track ball is used to perform this task. The two-dimensional input devices allow manipulation of a pointer in both dimensions of the two dimensional space and allows accurate selection for a desk top user. However, manipulation of a pointer in two-dimensional space with a two dimensional input device is difficult during mobile use. Therefore, the two-dimensional input device is not adequate for manipulating a pointer on a two-dimensional display of a mobile users equipment such as a cell phone, a personal digital assistant or a head worn display.

Another two-dimensional input device comprises two separate one-dimensional adjustments such as a left/right button and up/down buttons. However this two-dimensional pointer means is also cumbersome for the user because the user must switch back and forth between the two adjustment mechanisms.

SUMMARY OF THE INVENTION

An object of the present invention is to provide a method and device for performing selection of an object in a two-dimensional display for use with a mobile terminal.

According to an embodiment of the present invention, a method for selecting an object in a two-dimensional display comprises specifying the distance of the object on the display from a reference location.

According to another embodiment of the invention, a device for selecting an object in a two dimensional display comprises a controller for increasing or decreasing a distance, i.e., radius, from a reference object.

Objects of interest are positioned a given distance from a reference location, such as the location of the mobile terminal. In accordance with a preferred embodiment, a circle is used to show on the display of the mobile terminal the current selected distance from the reference location. Preferably the circle and the reference location are centered on the display. As the size of the selection circle is increased or decreased, objects which are at the current selected distance are highlighted on the display and a user may activate a selected object using an activation device such as a button or a switch.

If objects may are positioned at approximately the same distance from the reference location, objects are sorted by some criteria to give a unique value to each of the objects. One criteria may comprise the order of appearance of the objects. Accordingly, the logical distance order of each of the objects from the reference object is always unique.

When the selection circle approaches a selectable object, preferably the speed of charge at the radius of the selection circle is reduced. Therefore, the controller may optionally include a speed coefficient which decreases the speed radius change when an object is within a predefined distance of the selection circle. Alternatively, the controller-to-display ratio may be continuously adjusted according to the distance between an object closest to the selection circle perimeter selected distance.

When an object on the display is highlighted by the selection circle, the user may select the object by actuating a controller to access information about the selected object which is stored in a database in the mobile terminal, a database which is wirelessly connectable to the mobile terminal and/or on the internet.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
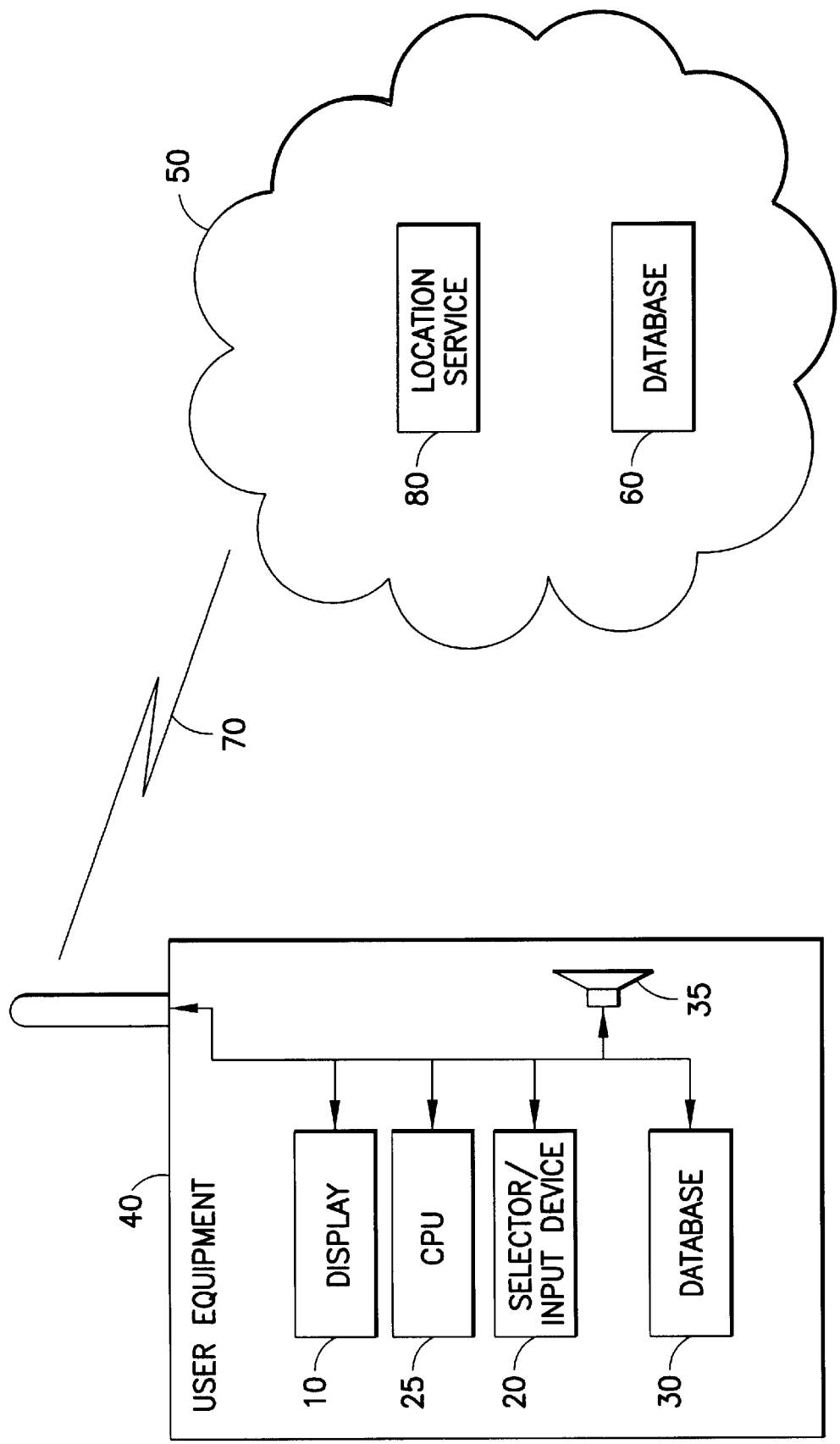
FIG. 1 is a schematic diagram showing a user equipment in a wireless network which may use the inventive method for selecting an object.

FIG. 1 is a block diagram showing a system in which the present invention is incorporated. A user equipment (UE) 40 comprises a mobile device with a display 10, selector 20, a CPU 25, and optionally a database 30 and a speaker 35. The UE 40 is connected via a wireless connection 70 to a network 50. The network 50 may comprise a database 60. The system may further comprise or be connected to a location service 80 for determining a geographic location of the UE 40. The UE 40 may comprise any type of computing equipment. However, the present invention is especially useful for computing devices that can be carried or worn such as personal digital assistants PDAs which allow computing anytime and anywhere. The present invention is even more specifically designed for use with a wearable computer combined with a head-worn display which allows the user to see a virtual map or depiction of the real world while simultaneously seeing the real world. This type of wearable computer must be usable during all varying situations in which users find themselves during the day including standing and walking.

Figure 2:
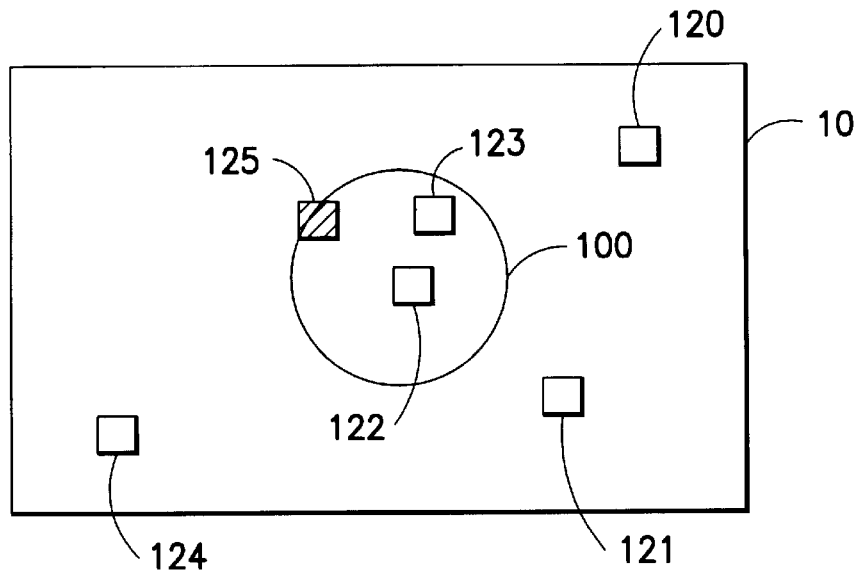
FIG. 2 shows a display on which selectable objects and a selection circle are displayed according to the present invention.

In FIG. 2, the display 10 shows a plan view of a virtual map of the real world with selectable objects 120–125. The display 10 may show an area that is selected by the user or the area shown may be proximate the current location of the UE 40. The selectable object are, for example, points of interest within the area displayed, such as retail stores, museums, government centers, etc. or points of interest within a particular building such as a museum or a shopping mall. Accordingly, the system may also comprise a locating service 80 for determining the geographic location of the UE 40. For example, the locating service 80 may comprise a Global Positioning Satellite (GPS) system or any locating system which utilizes the Base Transceiver Stations (BTSs) of a mobile communication system such as the Time of Arrival (TOA) positioning method, or the Observed Time Difference (OTD) positioning method. (These positioning methods are described in technical specification GSM 03.71, version 7.2.1). Furthermore, the location system 80 may comprise a cell ID based positioning method, Angle of Arrival (AOA) (see technical specification 3G TS 25.305, version 3.1.0), or any other method which may be used to determine the location of the UE 40.

Once the display 10 shows an area with selectable objects 120–125, the user controls the radius of a selection circle 100, which is depicted on the display, to select one of the objects 120–125. As the selection circle changes its radius, the cursor moves away from a previously selectable object toward a next selectable object. The coordinates of the objects may be stored in database 30 in the UE 40. Alternatively, the coordinate may be located in the database 60 in the network 50. In the latter case, once the location of the UE is known, the database 60, which may comprise a much higher capacity than the database 30 of the UE 40, may be searched to determine the coordinates of nearby selectable objects.

In the preferred embodiment, the center of the selection circle 100 is the location of the user equipment 40 and is centered on the display 10. However, the center of the selection circle 100 may alternatively be located so that it is not centered in the display 10. A user selects an object by adjusting the radius of the selection circle 100 until the radius of the circle equals the distance between the object to be selected and the center of the selection circle 100. The cursor thus comprises the perimeter of the selection circle. In FIG. 2, the object 125 is selected, i.e., "under the cursor". The selected object 125 may be highlighted or otherwise differentiated from the other displayed objects so that the user easily identifies when an object is selected.

More than one object may be "under the cursor" at the same time. For example, in FIG. 3 the display is positioned so that objects 122, 123, and 125 are all on the perimeter of the selection circle 100, i.e., their distance to the UE 40, is approximately the same. Therefore, these objects 122, 123, 125 appear to be under the cursor at the same time. However, each of these objects must be individually selectable. Therefore, a logical distance is defined for objects that are at approximately the same physical distance from the center point of the selection circle 100. The objects that are approximately the same physical distance are further sorted by some criteria that gives a unique logical value. On the screen, the objects are drawn according to their approximate actual coordinates. The logical values are for internal use only by the CPU 25 of the UE 40.

When several objects are approximately on the perimeter of the selection circle and are separated only by a logical distance, it can be difficult to specify the correct object because the cursor easily slips to the next or previous object. This problem may also occur for objects whose physical distances to the center of the selection circle are very close together. To overcome this problem, the CPU 25 may employ a speed coefficient which is dependent on the change in radius required to move the perimeter of the selection circle from the previous or current selectable object to the next selectable object. If the previous and next selectable objects are very close together, the speed coefficient is adjusted so that the rate of change in radius of the selection circle decreases. If the objects are further apart, the speed coefficient is adjusted so that rate of change in radius of the selection circle increases.

When an object under the perimeter of the selection circle is selected, information about the object is provided visually and/or aurally, to the user. The information may be stored in the UE 40 either by pre-programming or data base 30 through a download from a database, either wirelessly or through a direct connection. Alternatively, the information may be stored in a database 60 of the network 50. Alternatively, or in addition to either of the above alternatives, the UE 40 may be connected to an internet or intranet website where upon information about the object is provided to the UE 40. The information may be textual, graphical, photographic, and/or aural. For example, if the objects are pieces of art in a museum, the information about the selected artwork is provided to the user. If the objects are stores in a city, or a shopping mall, the information may be the street address at the stores and/or advertising information.

Figure 4:
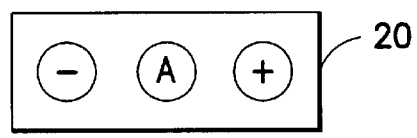
FIG. 4 is a schematic diagram of a selector according to an embodiment of the present invention.

FIG. 4 is an example of a selector which may be used. Selector 20 comprises a '+' button a '−' button and an activation button when the '+' button is pressed, the radius of the selection circle increased. When the '−' button is pressed, the radius of the selection circle is decreased. The rate of change in radius may comprise a change in radius per time unit that the '+' button or the '−' button is held down. Alternatively, the rate of change in radius may comprise a change in radius per each depression of the '−' button or the '−' button. Depressing the activation button signals that the user has selected a particular object on the display.

Figure 3:
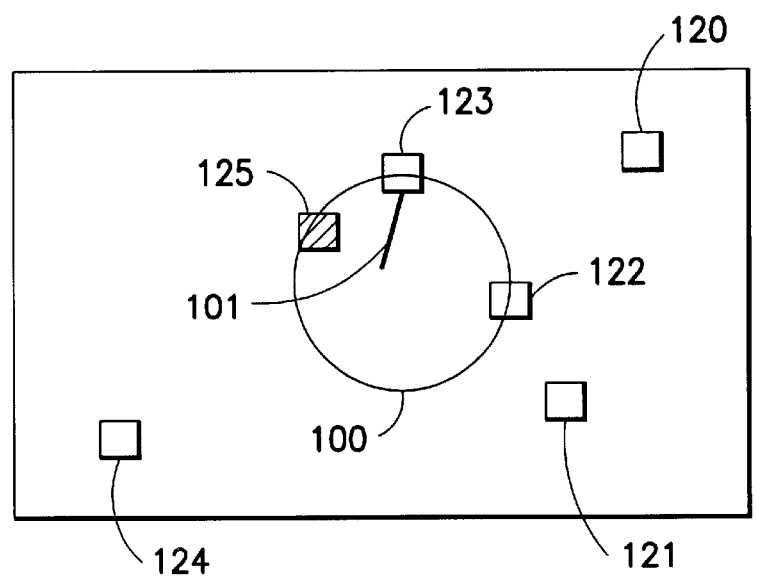
FIG. 3 shows a display in which three objects are equidistant from a center of a selection circle.

To facilitate determination of the object that is to be selected next as the radius is changing, a preview pointer 101 may be used (see FIG. 3). The preview pointer 101 is a line drawn between the center of the circle 100 and the next object to be selected. The preview pointer allows the user to concentrate on the object and wait for it to be selected while operating the selector 20.

In the preferred embodiment selecting an object is a moded task. That is, the user must activate the selector 20 to make the circle 100 visible on the display 10. Once the circle appears, the user manipulates the selector 20 and either activates a selected object with the activation button or cancels the selection task. The cancellation may be automatic after a time delay has elapsed since the last use of the selector 20. The selector 20 may also have a cancel switch or button in addition to or instead of the time cancellation.

Once the selector 20 is activated, the radius of the selection circle is set to zero so that the circle is a point on the screen. The user may then increase radius and then further increase or decrease the radius to select an object. Alternatively, the radius may be set to an arbitrary value between the minimum and maximum size of the selection circle 100.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for selecting an object on a two-dimensional display of a user equipment using a one-dimensional input, comprising:

displaying a selection circle on the display; and pointing to the object on the display by changing a radius of the selection circle until a perimeter of the selection circle coincides with the object.

2. The method of claim 1, further comprising displaying a plan view of a geographical area in which the user equipment is located, wherein the selection circle is displayed on the display so that a center of the selection circle corresponds to a position of the user equipment in the geographical area being displayed.

3. The method of claim 2, wherein said step of displaying a plan view of a geographical area comprises displaying the geographical area so that the position of the user equipment in the geographical area is centered on the display.

4. The method of claim 2, wherein said step of displaying a plan view comprising downloading information regarding the plan view from a database in one of the user equipment, a network to which the user equipment is connected, and the internet.

5. The method of claim 1, further comprising the step of selecting the object after said step of pointing to the object.

6. The method of claim 5, wherein said step of selecting the object comprises activating a selector means when the perimeter of the selection circle coincides with the object.

7. The method of claim 1, further comprising the step of using a pointer to indicate the next object to be selected during said step of changing a radius of the selection circle.

8. The method of claim 7, wherein said step of using a pointer comprises displaying a line between the center of the selection circle to the next object to be selected during said step of changing a radius of the selection circle.

9. The method of claim 1, wherein said step of pointing to the object further comprises defining a logical distance for objects that are approximately the same physical distance from the center of the selection circle, wherein said logical distance allows individual selection of each of the objects that are approximately the same physical distance from the center of the selection circle during said step of changing a radius of the selection circle.

10. The method of claim 9, wherein said step of defining a logical distance comprises sorting the objects that are approximately the same physical distance from the center of the selection circle by a criteria that exhibits a unique logical value for each of the objects that are the approximately same physical distance from the center of the selection circle.

11. The method of claim 10, wherein said step of sorting the objects comprises sorting the objects by order of appearance.

12. The method of claim 1, wherein said step of changing the radius of said selection circle comprises changing the radius from a first radius to a second radius, wherein a rate of change of said changing a radius in dependent on the distance between said first radius and said second radius.

13. The method of claim 12, wherein said first radius comprises one of a minimum radius of said selection circle, a maximum radius of said selection circle, and a radius corresponding to a previous selectable object which selection circle is moving away from and said second radius corresponds to the next selectable object the selection circle is moving toward.

14. The method of claim 13, wherein the rate of change comprises a change in radius per one of a length of time of operation of an input device, a number of operations of said input device, and a speed of operation of said input device.

15. The method of claim 14, further comprising the step of removing the selection circle after a time limit has elapsed since the last manipulation of the radius selector drive.

16. The method of claim 1, wherein said step of displaying a selection circle comprises displaying the selection circle in response to a manipulation of radius selector device.

17. The method of claim 1, further comprising the step of downloading information regarding a selected object.

18. The method of claim 17, wherein said step of downloading information comprises downloading from a database in one of the user equipment, a network to which the user equipment is connected, and the internet.

19. An apparatus for displaying selectable objects on a display and selecting one of said selectable objects, comprising:

a two-dimensional display for displaying said selectable means for displaying the said selectable objects;

means for displaying a selection circle on said display;

an input device comprising means for adjusting a radius of said selection circle; and means for pointing to one of said selectable objects by adjusting a radius of said selection circle via said means for adjusting until a perimeter of the selection circle coincides with the object.

20. The method of claim 19, further comprising means for determining a location of said apparatus and means for displaying a plan view of a geographical area surrounding said location of said apparatus.

21. The apparatus of claim 19, wherein said input device further comprises means for activating an object selected by said means for selecting.

22. The apparatus of claim 19, wherein said means for pointing comprises means for indicating the next object to be selected.

23. The apparatus of claim 22, wherein said means for indicating comprises means for displaying a line between the center of said selection circle to the next object to be selected.

24. The apparatus of claim 19, wherein said means for pointing further comprises means for defining a logical distance for objects that are approximately the same physical distance from the center of the selection circle, thereby allowing individual selection of each of the objects that are approximately the same physical distance from the center of the selection circle.

25. The apparatus of claim 24, wherein said means for defining a logical distance comprises means for sorting the objects that are approximately the same physical distance from the center of the selection circle.

26. The apparatus of claim 25, wherein said means for sorting comprises means for sorting the objects by their order of appearance.

27. The apparatus of claim 19, wherein a rate of change of said radius of said selection circle via said means for adjusting is dependent on a difference between a first radius and a second radius, wherein said first radius comprises one of a minimum radius of said selection circle, a maximum radius of said selection circle, and a radius corresponding to a previous selectable object which selection circle is moving away from and said second radius corresponds to the next selectable object the selection circle is moving toward.

28. The apparatus of claim 27, wherein the rate of change comprises a change in radius per one of a length of time of operation of said means for adjusting a number of operations of said means for adjusting, and a speed of operation of said means for adjusting.

* * * * *